Nov. 1, 1949.  D. H. TEETOR  2,486,446
METHOD OF GAUGING BEARING CLEARANCE
Filed Sept. 11, 1947
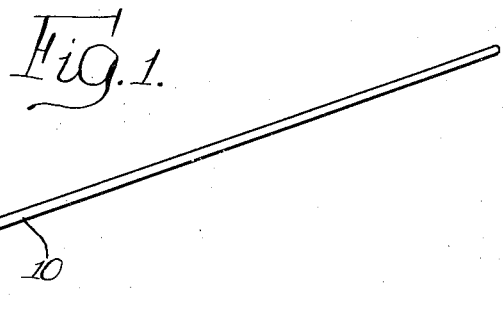
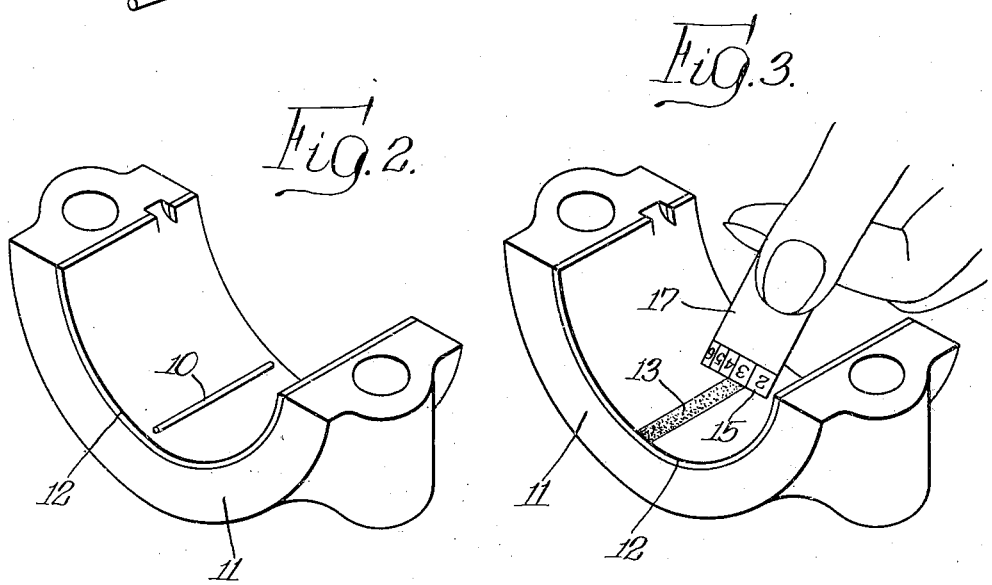
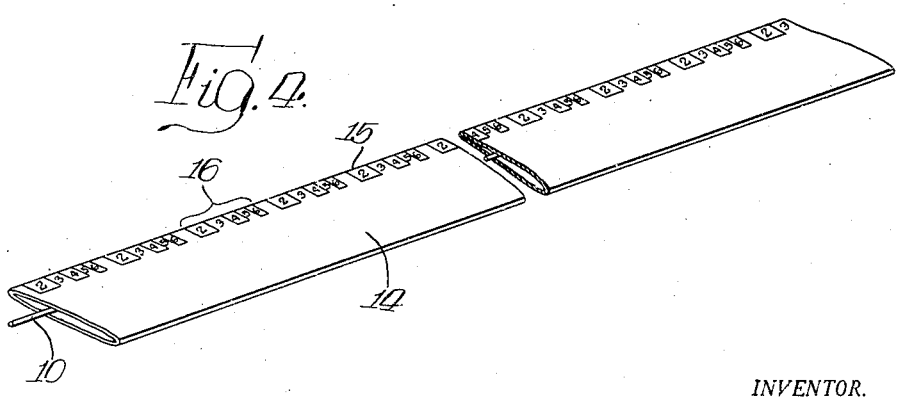
INVENTOR.
Don H. Teetor,
BY
Davis, Lindsey, Hibben + Royes
Attys.

Patented Nov. 1, 1949

2,486,446

UNITED STATES PATENT OFFICE 2,486,446

METHOD OF GAUGING BEARING CLEARANCE

Donald Hartley Teetor, Hagerstown, Ind., assignor to Perfect Circle Corporation, Hagerstown, Ind., a corporation of Indiana Application September 11, 1947, Serial No. 773,331

6 Claims. (Cl. 33—174)

The invention relates to a method for measuring or gauging the clearance in a shaft bearing such as a bearing for the crankshaft of an automobile engine, and material for performing such method.

The general object of the invention is to provide a novel method for gauging the clearance between a bearing and the shaft supported thereby, which accurately indicates the exact clearance between the shaft and bearing when the two are assembled in their normal relation.

Another object is to provide a novel method for gauging or measuring such clearance, which indicates variations in the clearance throughout the length of the bearing, so that adjustment of the bearing to take up excessive clearance may be made for the minimum clearance found, thus avoiding adjustment that might cause undue tightness at some point in the bearing.

Another object is to provide a novel method of the foregoing character, which is simple to perform without need for complicated or delicate apparatus, and which does not require any great skill on the part of the operator to obtain accurate results.

A further object is to provide a novel article of manufacture comprising material for performing the above-mentioned method.

Other objects and advantages will become apparent from the following description taken in connection with the accompanying drawings, in which:

Figure 1 is an enlarged view of a piece of material utilized in carrying out the method of the present invention.

Figure 2 is a perspective view showing a piece of such material laid in a bearing preparatory to determining the amount of clearance.

Figure 3 is a view similar to Figure 2 but showing the step of measuring the material to determine the clearance.

Figure 4 is a perspective view showing the manner in which the material is preferably packaged.

In bearing structures such as the bearings for a crankshaft of an automobile engine, damage to the engine may result from excessive clearance between the bearings and the shaft. If the clearance is excessive, adjustment of the bearing to decrease the clearance should be made.

Difficulty is encountered, however, in accurately determining what clearance exists in a bearing because the ends of such bearings are not accessible for use of a feeler gauge or the like. Measurement of the shaft diameter and the internal diameter of the bearing when the two are separated, to determine the clearance, requires considerable skill to obtain an accurate result.

The present invention provides a simple method of determining with a high degree of accuracy the clearance existing between the shaft and the bearing when they are assembled in their normal relation. It is based on the principle that a piece of readily deformable material having a known cross-sectional size will, when flattened, provide a width which bears a definite relation to its thickness. With a material which tends under pressure to compact, that is, to become more dense, compensation for such compacting must be made in determining the thickness from the width. Thus, by placing a piece of such material in the bearing structure and flattening it by assembling the shaft and bearing in their normal relation to each other, the width of the flattened material can be measured after disassembling the bearing. By using a scale for measuring the flattened width, which is calibrated to read in values for thickness with compensation for compacting of the material, a direct and highly accurate determination of the clearance can be made.

Such method will not only disclose the clearance generally, but will also disclose variations in clearance throughout the length of the bearing, since different amounts of clearance in different parts of the bearing will produce variations in the flattened width. Thus, not only is the clearance determined by the present method but also variations in the bearing surface are detected. With this knowledge, the mechanic adjusting the bearing can make the proper adjustment without danger of having the bearing too tight because of some high point in the bearing or the journal.

The form of material which I prefer to use in performing this method is a stick or rod round in cross-section and comprising a wax which is readily deformable by pressure. It should not, of course, be so readily deformable that its diameter would be changed by ordinary handling. A wax which I have found to be satisfactory is composed chiefly of a chlorinated naphthalene compound with a small amount of a suitable synthetic resin. Such wax has a flow point of 277° F. to 283° F. and therefore is not unduly soft at ordinary temperatures. This compound normally has a yellow color, but to make it more visible for measuring it when flattened, I preferably add a very small amount of dye, say, red dye, which color strongly contrasts with the color of the metal bearing.

In Figure 1 of the drawing, I have shown an enlarged view of a piece 10 of the material employed. Such material is shown as a round rod of uniform diameter through its length. For measuring clearances, say, from .002 to .006 of an inch, I prefer to use a rod having an initial diameter of .022 of an inch, while for measuring clearances of .004 to .009 of an inch I may use a rod having an initial diameter of .036 of an inch. The relation of the initial diameter to the flattened thickness should be such that a substantial flattening of the rod will occur so that its flattened width will be several times greater than its initial diameter, and yet the rod will not have to be flattened so much that excessive pressures are required. I have found that, if the ratio of initial diameter of the rod to the clearance to be measured, or in other words, the flattened thickness, is within the range of 3:1 to 12:1, the foregoing conditions are fulfilled.

In performing the measuring operation, a piece of the rod, which is preferably supplied in lengths sufficient for measuring several bearings, is broken off to a length which will extend for substantially the full length of the bearing. The bearing cap, indicated at 11, which is assumed to be disassembled, is wiped clean of oil, as well as the crankshaft. Such a bearing is usually provided with an insert 12 of suitable bearing metal. The broken-off length of rod 10 is then placed on the bearing, as illustrated in Figure 2, and the crank shaft and bearing is then re-assembled. In such re-assembly, the bearing bolts are tightened to the pressure recommended by the engine manufacturer. Tightening of the bolts to such pressure is not necessary if the engaging faces of the bearing body and cap are prefectly flat and true, since merely bringing such faces into engagement will produce the clearance to be measured. However, if such faces are not flat and true, different bolt pressures will distort the bearing to different degrees and the clearance will be correspondingly affected. By tightening the bolts to the pressure recommended, the clearance will be that found in the bearing when assembled in its normal relation, and the wax rod will be compressed to the thickness equal to the clearance existing under normal conditions. Turning of the crankshaft during such assembly is avoided, since such turning would tend to rub the wax circumferentially of the bearing and give an inaccurate result.

After the wax rod has been so compressed, the bearing cap is removed. The flattened rod may adhere either to the bearing or to the crankshaft but it does not matter which condition occurs, since the flattened wax may be measured in either position. In Figure 3 of the drawing, I have shown the flattened wax, indicated at 13, as adhering to the bearing 11, that is, to the insert 12 therein. The width of the flattened material 13 is then measured, preferably in the manner hereinafter described, to determine the thickness.

If the bearing has a clearance which is uniform throughout the length of the bearing, the flattened width of the strip of wax 13 will of course be uniform as illustrated in Figure 3. Variations in clearance, however, will be readily apparent from variations in width of the flattened material. The greatest width, of course, indicates the least clearance, and gradual variations in width indicate the corresponding condition of the clearance. However, should the flattened material be sharply narrowed at some point, such condition indicates a scratch or shallow gouge in the surface of the bearing insert or crankshaft.

When the amount of clearance has been determined by measuring the width of the flattened material 13, the latter is removed from the bearing, and the bearing is adjusted in the usual manner to take up the clearance. If the clearance is shown to be uniform throughout the length of the bearing by a constant width for the flattened material, the amount of adjustment of the bearing is apparent. If, however, the flattened material shows a variation in width, then the widest point on the material should be measured to determine the clearance, since such widest point occurs at the point of minimum clearance. The bearing, of course, should be adjusted for such minimum clearance, since adjustment for any greater clearance would result in excessive tightness at the point or points of minimum clearance.

The manner in which the width of the flattened material may be measured to determine the clearance is an important feature of the invention. It is desirable, from the standpoint of simplicity, to calibrate the scale used for measuring the width so that it reads directly in terms of corresponding thicknesses. Also, with any readily deformable material such as wax, the material will compact to some extent under the pressure applied to the material in flattening it, and the scale should be calibrated to compensate for such compacting.

In the present instance, I provide a scale which has been calibrated in both respects and which has the added feature of being always readily available in that it is provided on the container in which the wax rod is sold. Thus, as shown in Figure 4, the wax rod is placed in an elongated envelope 14 with the former of sufficient length to provide material for measuring the clearance in several bearings. In actual practice, the envelope and rod are each approximately one foot long, such length being found most convenient. The envelope is preferably about one inch wide, although such width is not all important since any width that will permit it to be easily handled in the manner hereinafter described is sufficient. Along one of the longer edges of the envelope, I provide a scale 15, which may be printed on the envelope. The scale 15 comprises a series of indicia showing thicknesses or clearances corresponding to the different widths of flattened material, the scale being calibrated to compensate for compacting of the material. Since the particular wax rod herein illustrated is adapted for measuring clearances from .002 to .006 of an inch, the scale includes five spaces respectively marked 2, 3, 4, 5 and 6 and having widths equal to the widths of the flattened material for clearances for each thousandth of an inch between said limits. The total length along the edge of the envelope representing the sum of all these widths is small compared to the total length of the envelope so the scale is repeated along the envelope edge, the length of one scale being indicated by the bracket 16.

To use the scale to the greatest advantage, a small piece of the envelope is torn off, such piece being indicated at 17 in Figure 3 and including at least a complete set of width spaces, that is, a set including all widths for the thicknesses or clearances within the above-mentioned limits. The piece 17 may, of course, be that part of the envelope, which enclosed the piece of rod 10 used in making that particular measurement. A piece 17 of such length is readily placed in the bearing to find the space thereon that corresponds to the maximum width of the flattened material. Since the envelope is made of flexible material such as paper it may be easily held in the bearing, as illustrated in Figure 3, and will conform to the curvature of the bearing, so that a close comparison of a space on the scale 15 with the width of the flattened material 13 can be made with the naked eye. The width of the envelope, as heretofore stated, is sufficient to permit the piece 17 to be readily held in measuring position, which, as illustrated in Figure 3, may be done by grasping the edge of the piece 17 opposite to the scale 15 between the thumb and forefinger.

From the foregoing description, it is evident that I have provided a novel method for gauging the clearance in a bearing of the character mentioned. The wax rod is readily inserted in the bearing, and by assembling the bearing in its normal relation, the wax will be flattened to the exact amount of clearance. The resultant width of the flattened material is of sufficient size to be readily measured by a comparison of its width with the scale 15 printed on the envelope, thus providing a simple procedure requiring no high degree of skill to obtain an accurate result.

I claim:

1. The method of measuring the clearance in a shaft bearing structure between the shaft and the bearing, which comprises placing on the bearing a rod of readily deformable material having a predetermined diameter and a length substantially greater than its diameter, assembling said bearing structure in its normal relation to flatten said rod, disassembling the bearing structure, and measuring the width of the flattened rod to determine the thickness thereof.

2. The method of measuring the clearance in a shaft bearing structure between the shaft and the bearing, which comprises placing on the bearing a rod of readily deformable material having a predetermined diameter and a length substantially greater than its diameter, assembling said bearing structure in its normal relation to flatten said rod, disassembling the bearing structure, and measuring the width of the flattened rod on a scale calibrated to compensate for compacting of the rod to determine the thickness thereof.

3. The method of measuring the clearance in a shaft bearing structure between the shaft and the bearing where the clearance is of the order of a few thousandths of an inch, which method comprises placing lengthwise on the bearing a rod of readily deformable material of a length not substantially less than the length of the bearing, assembling the bearing structure in its normal relation to flatten the rod and thereby spread it laterally in the clearance, disassembling the bearing structure leaving the flattened rod on the part to which it adheres, and measuring the width of the flattened rod with a scale calibrated to compensate for compacting of the rod and to indicate the thickness thereof, the initial diameter of the rod being sufficiently greater than the clearance to provide a flattened width readily compared with the scale by the naked eye.

4. The method of measuring the clearance in a shaft bearing structure between the shaft and the bearing where the clearance is of the order of .002 to .009 of an inch, which method comprises placing lengthwise on the bearing a rod of readily deformable material of a length not substantially less than the length of the bearing, assembling the bearing structure in its normal relation to flatten the rod and thereby spread it laterally in the clearance, disassembling the bearing structure leaving the flattened rod on the part to which it adheres, and measuring the width of the flattened rod with a scale calibrated to compensate for compacting of the rod and to indicate the thickness thereof, the initial diameter of the rod being of the order of three to twelve times greater than the clearance to provide substantial width for the flattened rod readily compared with the scale.

5. The method of measuring the clearance in a shaft bearing structure between the shaft and bearing members, which comprises placing lengthwise on the bearing member a wax rod of uniform predetermined diameter greater than the clearance to be measured and having a length substantially equal to the length of the bearing, assembling the bearing structure with normal pressure on the bearing bolts to flatten the rod between the two members to a thickness equal to the clearance obtained by such pressure, the wax thereby spreading laterally as a result of such flattening, disassembling the bearing structure and separating the members with the wax adhering to one of the members, and measuring the width of the flattened wax, while adhering to said one member, by comparing it with a scale calibrated to compensate for compacting of the wax and indicating the corresponding thickness.

6. The method of measuring the clearance in a shaft bearing structure between the shaft and bearing members, which comprises placing lengthwise on the bearing member a wax rod of uniform predetermined diameter greater than the clearance to be measured and having a length substantially equal to the length of the bearing, assembling the bearing structure with normal pressure on the bearing bolts to flatten the rod between the two members to a thickness equal to the clearance obtained by such pressure, the wax thereby spreading laterally as a result of such flattening, disassembling the bearing structure, calibrating a scale to indicate thicknesses corresponding to flattened widths of a wax rod initially of said diameter including compensation for compacting of the wax, and comparing said scale with the flattened wax to determine the clearance in the bearing structure.

DONALD HARTLEY TEETOR.

REFERENCES CITED

The following references are of record in the file of this patent:

UNITED STATES PATENTS

| Number | Name | Date |
| --- | --- | --- |
| 2,418,421 | Murray | Apr. 1, 1947 |